(12) United States Patent
Baar et al.

(10) Patent No.: US 9,323,413 B2
(45) Date of Patent: Apr. 26, 2016

(54) GRAPHICAL USER INTERFACE WITH ZOOM FOR DETAIL-IN-CONTEXT PRESENTATIONS

(75) Inventors: David Baar, Vancouver (CA); Timothy Lochner, Vancouver (CA); Garth Shoemaker, Coquitlam (CA)

(73) Assignee: CALLAHAN CELLULAR L.L.C., Wilmington, DE (US)

( * ) Notice: Subject to any disclaimer, the term of this patent is extended or adjusted under 35 U.S.C. 154(b) by 2239 days.

(21) Appl. No.: 11/691,686

(22) Filed: Mar. 27, 2007

(65) Prior Publication Data

US 2007/0198941 A1 Aug. 23, 2007

Related U.S. Application Data

(63) Continuation of application No. 10/166,736, filed on Jun. 12, 2002, now Pat. No. 7,213,214.

(30) Foreign Application Priority Data

Jun. 12, 2001 (CA) .................................... 2350342

(51) Int. Cl.
*G06F 3/0481* (2013.01)
*G06F 3/0482* (2013.01)
*G06F 3/0483* (2013.01)
*G09G 5/14* (2006.01)

(52) U.S. Cl.
CPC .... *G06F 3/0481* (2013.01); *G06F 2203/04806* (2013.01)

(58) Field of Classification Search
CPC ... G06F 3/0481; G06F 3/0482; G06F 3/0483; G06F 9/4443; G06F 17/30905; G06F 2203/04806; G09G 5/14

USPC .......................................... 715/800, 764, 810
See application file for complete search history.

(56) References Cited

U.S. PATENT DOCUMENTS

| 3,201,546 A | 8/1965 | Richardson |
| 3,704,938 A | 12/1972 | Fanselow |
| 3,739,739 A | 6/1973 | Brase |
| 3,762,799 A | 10/1973 | Shapiro |
| 4,581,647 A | 4/1986 | Vye |

(Continued)

FOREIGN PATENT DOCUMENTS

| CA | 2350342 | 11/2002 |
| CA | 2386560 | 11/2003 |

(Continued)

OTHER PUBLICATIONS

Robertson, et al., ""The Document Lens"", (1993),pp. 101-108.

(Continued)

*Primary Examiner* — Amy Ng
*Assistant Examiner* — Erik Stitt
(74) *Attorney, Agent, or Firm* — McAndrews, Held & Malloy, Ltd.

(57) ABSTRACT

A graphical user interface (GUI) is provided for manipulating a presentation of a region of interest within visual information displayed on a display screen of a computer display system. The GUI includes: a first bounding shape surrounding the focal region; a second bounding shape surrounding the shoulder region; a base outline; a pickup point; a slide bar; a move area within the region of interest; at least one zoom area; and, a zoom button.

24 Claims, 5 Drawing Sheets

(56) References Cited

U.S. PATENT DOCUMENTS

| | | |
|---|---|---|
| 4,630,110 A | 12/1986 | Cotton et al. |
| 4,688,181 A | 8/1987 | Cottrell et al. |
| 4,757,616 A | 7/1988 | Hills |
| 4,790,028 A | 12/1988 | Ramage |
| 4,800,379 A * | 1/1989 | Yeomans ............ 345/661 |
| 4,885,702 A | 12/1989 | Ohba |
| 4,888,713 A | 12/1989 | Falk |
| 4,970,028 A | 11/1990 | Kenyon et al. |
| 4,985,849 A | 1/1991 | Hideaki |
| 4,992,866 A | 2/1991 | Morgan |
| 5,031,918 A | 7/1991 | Brill |
| 5,048,077 A | 9/1991 | Wells et al. |
| 5,175,808 A | 12/1992 | Sayre |
| 5,185,599 A | 2/1993 | Dorrnink et al. |
| 5,185,667 A | 2/1993 | Zimmermann |
| 5,200,818 A | 4/1993 | Neta et al. |
| 5,206,721 A | 4/1993 | Ashida et al. |
| 5,227,771 A | 7/1993 | Kerr et al. |
| 5,250,934 A | 10/1993 | Denber et al. |
| 5,258,837 A | 11/1993 | Gormley |
| 5,269,687 A | 12/1993 | Mott et al. |
| 5,275,019 A | 1/1994 | Pagani |
| 5,309,279 A | 5/1994 | Halstead |
| 5,321,807 A | 6/1994 | Mumford |
| 5,329,310 A | 7/1994 | Liljegren et al. |
| 5,341,466 A | 8/1994 | Perlin et al. |
| 5,369,527 A | 11/1994 | McCracken |
| 5,416,900 A | 5/1995 | Blanchard et al. |
| 5,432,895 A | 7/1995 | Myers |
| 5,451,998 A | 9/1995 | Hamrick |
| 5,459,488 A | 10/1995 | Geiser |
| 5,473,740 A | 12/1995 | Kasson |
| 5,521,634 A | 5/1996 | McGary |
| 5,523,783 A | 6/1996 | Cho |
| 5,528,289 A | 6/1996 | Cortjens et al. |
| 5,539,534 A | 7/1996 | Hino et al. |
| 5,581,670 A | 12/1996 | Bier et al. |
| 5,583,977 A | 12/1996 | Seidl |
| 5,588,098 A | 12/1996 | Chen et al. |
| 5,594,859 A | 1/1997 | Palmer et al. |
| 5,596,690 A | 1/1997 | Stone et al. |
| 5,598,297 A | 1/1997 | Yamanaka et al. |
| 5,610,653 A | 3/1997 | Abecassis |
| 5,613,032 A | 3/1997 | Cruz et al. |
| 5,638,523 A | 6/1997 | Mullet et al. |
| 5,644,758 A | 7/1997 | Patrick |
| 5,651,107 A | 7/1997 | Frank et al. |
| 5,652,851 A | 7/1997 | Stone et al. |
| 5,657,246 A | 8/1997 | Hogan et al. |
| 5,670,984 A * | 9/1997 | Robertson et al. ............ 345/585 |
| 5,680,524 A | 10/1997 | Maples et al. |
| 5,682,489 A | 10/1997 | Harrow et al. |
| 5,689,287 A * | 11/1997 | Mackinlay et al. ........... 345/427 |
| 5,689,628 A | 11/1997 | Robertson |
| 5,721,853 A | 2/1998 | Smith |
| 5,729,673 A | 3/1998 | Cooper et al. |
| 5,731,805 A | 3/1998 | Tognazzini et al. |
| 5,742,272 A | 4/1998 | Kitamura et al. |
| 5,745,166 A | 4/1998 | Rhodes et al. |
| 5,751,289 A | 5/1998 | Myers |
| 5,754,348 A | 5/1998 | Soohoo |
| 5,764,139 A | 6/1998 | Nojima et al. |
| 5,786,814 A | 7/1998 | Moran et al. |
| 5,798,752 A | 8/1998 | Buxton et al. |
| 5,808,670 A | 9/1998 | Oyashiki et al. |
| 5,812,111 A | 9/1998 | Fuji et al. |
| 5,818,455 A | 10/1998 | Stone et al. |
| 5,848,231 A | 12/1998 | Teitelbaum et al. |
| 5,852,440 A | 12/1998 | Grossman et al. |
| 5,872,922 A * | 2/1999 | Hogan et al. .................. 709/204 |
| 5,909,219 A | 6/1999 | Dye |
| 5,923,364 A | 7/1999 | Rhodes et al. |
| 5,926,209 A | 7/1999 | Glatt |
| 5,949,430 A | 9/1999 | Robertson et al. |
| 5,950,216 A | 9/1999 | Amro et al. |
| 5,959,605 A | 9/1999 | Gilblom |
| 5,969,706 A | 10/1999 | Tanimoto et al. |
| 5,973,694 A | 10/1999 | Steele et al. |
| 5,991,877 A | 11/1999 | Luckenbaugh |
| 5,999,879 A | 12/1999 | Yano |
| 6,005,611 A | 12/1999 | Gullichsen et al. |
| 6,037,939 A * | 3/2000 | Kashiwagi et al. ........... 715/798 |
| 6,052,110 A | 4/2000 | Sciammarella et al. |
| 6,057,844 A | 5/2000 | Strauss |
| 6,064,401 A | 5/2000 | Holzman et al. |
| 6,067,372 A | 5/2000 | Gur et al. |
| 6,072,501 A | 6/2000 | Bier |
| 6,073,036 A * | 6/2000 | Heikkinen et al. ......... 455/550.1 |
| 6,075,531 A | 6/2000 | DeStefano |
| 6,081,277 A | 6/2000 | Kojima |
| 6,084,598 A | 7/2000 | Chekerylla |
| 6,091,771 A | 7/2000 | Seeley et al. |
| 6,108,005 A | 8/2000 | Starks et al. |
| 6,128,024 A | 10/2000 | Carver |
| 6,133,914 A | 10/2000 | Rogers et al. |
| 6,147,709 A * | 11/2000 | Martin et al. ................. 348/239 |
| 6,154,840 A | 11/2000 | Pebly et al. |
| 6,160,553 A | 12/2000 | Robertson et al. |
| 6,184,859 B1 | 2/2001 | Kojima |
| 6,198,484 B1 | 3/2001 | Kameyama |
| 6,201,546 B1 | 3/2001 | Bodor et al. |
| 6,201,548 B1 | 3/2001 | Cariffe et al. |
| 6,201,574 B1 * | 3/2001 | Martin .......................... 348/315 |
| 6,204,845 B1 | 3/2001 | Bates et al. |
| 6,204,850 B1 | 3/2001 | Green |
| 6,215,491 B1 | 4/2001 | Gould |
| 6,219,052 B1 | 4/2001 | Gould |
| 6,241,609 B1 | 6/2001 | Rutgers |
| 6,246,411 B1 | 6/2001 | Strauss |
| 6,249,281 B1 | 6/2001 | Chen et al. |
| 6,256,043 B1 | 7/2001 | Aho et al. |
| 6,256,115 B1 | 7/2001 | Adler et al. |
| 6,256,737 B1 | 7/2001 | Bianco et al. |
| 6,266,082 B1 | 7/2001 | Yonezawa et al. |
| 6,271,854 B1 | 8/2001 | Light |
| 6,278,443 B1 | 8/2001 | Amro et al. |
| 6,278,450 B1 | 8/2001 | Arcuri et al. |
| 6,288,702 B1 | 9/2001 | Tachibana et al. |
| 6,304,271 B1 | 10/2001 | Nehme |
| 6,307,612 B1 | 10/2001 | Smith et al. |
| 6,320,599 B1 | 11/2001 | Sciammarella et al. |
| 6,337,709 B1 | 1/2002 | Yamaashi et al. |
| 6,346,938 B1 | 2/2002 | Chan et al. |
| 6,346,962 B1 | 2/2002 | Goodridge |
| 6,359,615 B1 | 3/2002 | Singh |
| 6,381,583 B1 | 4/2002 | Kenney |
| 6,384,849 B1 | 5/2002 | Morcos et al. |
| 6,392,661 B1 | 5/2002 | Tankersley |
| 6,396,648 B1 | 5/2002 | Yamamoto et al. |
| 6,396,962 B1 | 5/2002 | Haffey et al. |
| 6,400,848 B1 | 6/2002 | Gallagher |
| 6,407,747 B1 | 6/2002 | Chui et al. |
| 6,411,274 B2 | 6/2002 | Watanabe et al. |
| 6,416,186 B1 | 7/2002 | Nakamura |
| 6,417,867 B1 | 7/2002 | Hallberg |
| 6,438,576 B1 | 8/2002 | Huang et al. |
| 6,487,497 B2 | 11/2002 | Khavakh et al. |
| 6,491,585 B1 | 12/2002 | Miyamoto et al. |
| 6,504,535 B1 | 1/2003 | Edmark |
| 6,515,663 B1 | 2/2003 | Hung et al. |
| 6,515,678 B1 | 2/2003 | Boger |
| 6,522,341 B1 | 2/2003 | Nagata |
| 6,523,024 B1 | 2/2003 | Yajima et al. |
| 6,542,191 B1 | 4/2003 | Yonezawa |
| 6,552,737 B1 | 4/2003 | Tanaka et al. |
| 6,559,813 B1 | 5/2003 | DeLuca et al. |
| 6,577,311 B1 | 6/2003 | Crosby et al. |
| 6,577,319 B1 | 6/2003 | Kashiwagi et al. |
| 6,584,237 B1 | 6/2003 | Abe |
| 6,590,568 B1 | 7/2003 | Astala et al. |
| 6,590,583 B2 | 7/2003 | Soohoo |
| 6,608,631 B1 | 8/2003 | Milliron |
| 6,612,930 B2 | 9/2003 | Kawagoe et al. |
| 6,631,205 B1 | 10/2003 | Melen et al. |

(56) References Cited

U.S. PATENT DOCUMENTS

| | | |
|---|---|---|
| 6,633,305 B1 | 10/2003 | Sarfield |
| 6,690,387 B2 | 2/2004 | Zimmerman et al. |
| 6,704,034 B1* | 3/2004 | Rodriguez et al. ............ 715/860 |
| 6,720,971 B1 | 4/2004 | Yamamoto et al. |
| 6,721,655 B1 | 4/2004 | Utsumi |
| 6,727,910 B2 | 4/2004 | Tigges |
| 6,731,285 B2* | 5/2004 | Matchen ...................... 345/428 |
| 6,731,315 B1 | 5/2004 | Ma et al. |
| 6,744,430 B1 | 6/2004 | Shimizu |
| 6,747,610 B1 | 6/2004 | Taima et al. |
| 6,747,611 B1 | 6/2004 | Budd et al. |
| 6,760,020 B1 | 7/2004 | Uchiyama et al. |
| 6,768,497 B2 | 7/2004 | Baar et al. |
| 6,798,412 B2 | 9/2004 | Cowperthwaite |
| 6,833,843 B2 | 12/2004 | Mojaver et al. |
| 6,842,175 B1 | 1/2005 | Schmalstieg et al. |
| 6,874,126 B1 | 3/2005 | Lapidous |
| 6,882,755 B2 | 4/2005 | Silverstein et al. |
| 6,906,643 B2 | 6/2005 | Samadani et al. |
| 6,911,975 B2 | 6/2005 | Iizuka et al. |
| 6,919,921 B1 | 7/2005 | Morota et al. |
| 6,924,822 B2 | 8/2005 | Card et al. |
| 6,938,218 B1 | 8/2005 | Rosen |
| 6,956,590 B1 | 10/2005 | Barton et al. |
| 6,961,071 B2 | 11/2005 | Montagnese et al. |
| 6,975,335 B2 | 12/2005 | Watanabe |
| 6,985,865 B1 | 1/2006 | Packingham et al. |
| 7,038,680 B2 | 5/2006 | Pitkow |
| 7,055,095 B1 | 5/2006 | Anwar |
| 7,071,971 B2 | 7/2006 | Elberbaum |
| 7,084,886 B2 | 8/2006 | Jetha et al. |
| 7,088,364 B2* | 8/2006 | Lantin ........................... 345/427 |
| 7,106,349 B2 | 9/2006 | Baar et al. |
| 7,133,054 B2 | 11/2006 | Aguera y Arcas |
| 7,134,092 B2 | 11/2006 | Fung et al. |
| 7,158,878 B2 | 1/2007 | Rasmussen |
| 7,173,633 B2 | 2/2007 | Tigges |
| 7,173,636 B2 | 2/2007 | Montagnese |
| 7,194,697 B2* | 3/2007 | Sinclair et al. ................ 715/800 |
| 7,197,718 B1* | 3/2007 | Westerman et al. .......... 715/801 |
| 7,197,719 B2* | 3/2007 | Doyle et al. .................. 715/801 |
| 7,213,214 B2* | 5/2007 | Baar et al. ..................... 715/801 |
| 7,233,942 B2 | 6/2007 | Nye |
| 7,246,109 B1 | 7/2007 | Ramaswamy |
| 7,248,269 B2* | 7/2007 | Card et al. ..................... 345/660 |
| 7,256,801 B2 | 8/2007 | Baar et al. |
| 7,274,381 B2 | 9/2007 | Mojaver et al. |
| 7,275,219 B2 | 9/2007 | Shoemaker |
| 7,280,105 B2 | 10/2007 | Cowperthwaite |
| 7,283,141 B2 | 10/2007 | Baar et al. |
| 7,310,619 B2 | 12/2007 | Baar et al. |
| 7,312,806 B2 | 12/2007 | Tigges |
| 7,321,824 B1 | 1/2008 | Nesbitt |
| 7,411,610 B2 | 8/2008 | Doyle |
| 7,423,660 B2 | 9/2008 | Ouchi et al. |
| 7,443,396 B2* | 10/2008 | Ilic ............................ 345/440.1 |
| 7,450,114 B2 | 11/2008 | Anwar |
| 7,472,354 B2 | 12/2008 | Jetha et al. |
| 7,486,302 B2 | 2/2009 | Shoemaker |
| 7,489,321 B2 | 2/2009 | Jetha et al. |
| 7,493,572 B2 | 2/2009 | Card et al. |
| 7,495,678 B2 | 2/2009 | Doyle et al. |
| 7,580,036 B2 | 8/2009 | Montagnese |
| 7,667,699 B2 | 2/2010 | Komar |
| 7,698,653 B2* | 4/2010 | Roman et al. ................. 715/798 |
| 7,714,859 B2 | 5/2010 | Shoemaker |
| 7,737,976 B2* | 6/2010 | Lantin ........................... 345/427 |
| 7,761,713 B2 | 7/2010 | Baar |
| 7,773,101 B2 | 8/2010 | Shoemaker |
| 8,032,843 B2* | 10/2011 | Ording et al. ................. 715/862 |
| 2001/0040585 A1 | 11/2001 | Hartford et al. |
| 2001/0040636 A1 | 11/2001 | Kato et al. |
| 2001/0048447 A1* | 12/2001 | Jogo ............................. 345/620 |
| 2001/0055030 A1 | 12/2001 | Han |
| 2002/0033837 A1 | 3/2002 | Munro |
| 2002/0038257 A1 | 3/2002 | Joseph et al. |
| 2002/0044154 A1 | 4/2002 | Baar et al. |
| 2002/0062245 A1 | 5/2002 | Niu et al. |
| 2002/0075280 A1 | 6/2002 | Tigges |
| 2002/0087894 A1 | 7/2002 | Foley et al. |
| 2002/0089520 A1 | 7/2002 | Baar |
| 2002/0093567 A1 | 7/2002 | Cromer et al. |
| 2002/0101396 A1 | 8/2002 | Huston et al. |
| 2002/0122038 A1 | 9/2002 | Cowperthwaite |
| 2002/0135601 A1 | 9/2002 | Watanabe et al. |
| 2002/0143826 A1 | 10/2002 | Day et al. |
| 2002/0171644 A1 | 11/2002 | Reshetov et al. |
| 2002/0180801 A1 | 12/2002 | Doyle et al. |
| 2003/0006995 A1 | 1/2003 | Smith et al. |
| 2003/0007006 A1 | 1/2003 | Baar et al. |
| 2003/0048447 A1 | 3/2003 | Harju et al. |
| 2003/0052896 A1 | 3/2003 | Higgins et al. |
| 2003/0052900 A1 | 3/2003 | Card et al. |
| 2003/0061211 A1 | 3/2003 | Shultz et al. |
| 2003/0076363 A1* | 4/2003 | Murphy ........................ 345/800 |
| 2003/0100326 A1 | 5/2003 | Grube et al. |
| 2003/0103063 A1* | 6/2003 | Mojaver et al. ............... 345/647 |
| 2003/0105795 A1 | 6/2003 | Anderson et al. |
| 2003/0112503 A1 | 6/2003 | Lantin |
| 2003/0118223 A1 | 6/2003 | Rahn et al. |
| 2003/0137525 A1 | 7/2003 | Smith |
| 2003/0151625 A1 | 8/2003 | Shoemaker |
| 2003/0151626 A1 | 8/2003 | Komar et al. |
| 2003/0174146 A1 | 9/2003 | Kenoyer |
| 2003/0179198 A1 | 9/2003 | Uchiyama |
| 2003/0179219 A1 | 9/2003 | Nakano et al. |
| 2003/0179237 A1 | 9/2003 | Nelson et al. |
| 2003/0196114 A1 | 10/2003 | Brew et al. |
| 2003/0210281 A1 | 11/2003 | Ellis et al. |
| 2003/0227556 A1 | 12/2003 | Doyle |
| 2003/0231177 A1 | 12/2003 | Montagnese et al. |
| 2004/0026521 A1 | 2/2004 | Colas et al. |
| 2004/0056869 A1* | 3/2004 | Jetha et al. ................... 345/620 |
| 2004/0056898 A1 | 3/2004 | Jetha et al. |
| 2004/0111332 A1 | 6/2004 | Baar et al. |
| 2004/0125138 A1 | 7/2004 | Jetha et al. |
| 2004/0150664 A1 | 8/2004 | Baudisch |
| 2004/0194014 A1 | 9/2004 | Anwar |
| 2004/0217979 A1 | 11/2004 | Baar et al. |
| 2004/0240709 A1 | 12/2004 | Shoemaker |
| 2004/0257375 A1 | 12/2004 | Cowperthwaite |
| 2004/0257380 A1 | 12/2004 | Herbert et al. |
| 2005/0041046 A1 | 2/2005 | Baar et al. |
| 2005/0134610 A1 | 6/2005 | Doyle et al. |
| 2005/0259118 A1 | 11/2005 | Mojaver et al. |
| 2005/0278378 A1 | 12/2005 | Frank |
| 2005/0285861 A1 | 12/2005 | Fraser |
| 2006/0022955 A1 | 2/2006 | Kennedy |
| 2006/0026521 A1 | 2/2006 | Hotelling et al. |
| 2006/0033762 A1 | 2/2006 | Card et al. |
| 2006/0036629 A1 | 2/2006 | Gray |
| 2006/0059432 A1 | 3/2006 | Bells |
| 2006/0082901 A1 | 4/2006 | Shoemaker |
| 2006/0098028 A1 | 5/2006 | Baar |
| 2006/0139375 A1 | 6/2006 | Rasmussen et al. |
| 2006/0192780 A1 | 8/2006 | Lantin |
| 2006/0214951 A1 | 9/2006 | Baar et al. |
| 2007/0033543 A1 | 2/2007 | Ngari et al. |
| 2007/0064018 A1 | 3/2007 | Shoemaker et al. |
| 2007/0097109 A1 | 5/2007 | Shoemaker et al. |
| 2009/0141044 A1 | 6/2009 | Shoemaker |
| 2009/0147023 A1 | 6/2009 | Jetha et al. |
| 2009/0172587 A1 | 7/2009 | Carlisle |
| 2009/0265656 A1 | 10/2009 | Jetha |
| 2009/0284542 A1 | 11/2009 | Baar |
| 2010/0026718 A1 | 2/2010 | Jetha |
| 2010/0033503 A1 | 2/2010 | Baar |
| 2010/0045702 A1 | 2/2010 | Doyle |
| 2010/0201785 A1 | 8/2010 | Lantin |

(56) References Cited

U.S. PATENT DOCUMENTS

2010/0208968 A1  8/2010  Shoemaker et al.
2010/0262907 A1  10/2010  Shoemaker et al.

FOREIGN PATENT DOCUMENTS

| CA | 2393708 | 1/2004 |
|---|---|---|
| CA | 2394119 | 1/2004 |
| EP | 0 635 779 A1 | 1/1995 |
| EP | 0650144 | 4/1995 |
| EP | 0816983 | 7/1998 |
| JP | 4410465 | 2/2010 |

OTHER PUBLICATIONS

"Non Final OA", U.S. Appl. No. 11/935,222, (Feb. 20, 2009), 12 pages.

Carpendale, M.S.T et al., ""A Framework for Unifying Presentation Space"", *01UIST. Proceedings of the 14th Annual ACM Symposium on User Interface Software and Technology, Proceedings of UIST '01: ACM Symposium on User Interface Software and Technology*, Orlando, FL, USA; XP002249323 2001, New York, NY, USA, ISBN: 1-58113-438-X,(Nov. 14, 2001),pp. 61-70; p. 64.

Ikedo, T ""A Realtime Video-Image Mapping User Polygon Rendering Techniques"", *IEEE Intl. conf on Ottawa*, ONT, Canada Jun. 3-6, 1997, Los Alamitos, CA, USA; *IEEE Comput. Soc*, US, XP010239181, ISBN: 0-8186-7819-4 Sections 2, 4.4; Multimedia Computing and Systems '97 Proceedings, (Jun. 3, 1997),p. 127-134.

Bouju, A. et al., ""Client-Server Architecture for Accessing Multimedia and Geographic Databases within Embedded Systems"", *Database and Expert Systems Applications, 1999 Proceedings. Tenth International Workshop on Florence*, Italy Sep. 1-3, 1999, Los Alamitos, CA, USA, *IEEE Comput. Soc*, US, XP010352370; ISBN:0-7695-0281-4, abstract, figure 2,(Sep. 1-3, 1999),pp. 760-764.

Robertson, G et al., "The Document Lens", *UIST. Proceedings of the Annual ACM Symposium on User Interface Software and Technology*. abstract figures 3,4,(Nov. 3, 1993),pp. 101-108.

Dursteler, Juan C., "The digital magazine of InfoVis.net", Retrieved from: http://www.infovis.net/printMag.php?num=85&lang=2; (Apr. 22, 2002).

"Presentation for CGDI Workshop", Retrieved from: http://www.geoconnections.org/developersCorner/devCorner_devNetwork/meetings/2002.05.30/IDELIX_CGDI_20020530_dist.pdf, (May 2002).

Kuederle, Oliver ""Presentation of Image Sequences: A Detail-in-Context Approach"", *Thesis*, Simon Fraser University; (Aug. 2000),pp. 1-3, 5-10, 29-31.

Microsoft Corp., "Microsoft Paint", Microsoft Corp.,(1981-1998),Paint 1-14.

"Electronic Magnifying Glasses", *IBM Technical Disclosure Bulletin*, IBM Corp., New York, US, vol. 37, No. 3; XP000441501, ISSN: 0018-8689; (Mar. 1, 1994),pp. 353-354.

Keahey, T. A., ""The Generalized Detail-in-Context Problem"", *Information Visualization 1998, Proceedings; IEEE Symposium on Research Triangle*, CA, USA; Los Alamitos, CA, USA, *IEEE Comput. Soc*, US; XP010313304; ISBN: 0-8186-9093,(Oct. 19-20, 1998),pp. 44-51, 152.

Carpendale, et al., ""3-Dimensional Pliable Surfaces: For the Effective Presentation of Visual Information"", *Proceedings of the 8th annual ACM symposium on User interface and software technology*; (Dec. 1995).

Carpendale, M S T et al., ""Extending distortion viewing from 2D to 3D"", *IEEE Computer Graphics and Applications, IEEE Inc. New York*, US, vol. 17, No. 4; XP000927815, ISSN: 0272-1716. (Jul. 1997),pp. 42-51.

Viega, J et al., ""3D magic lenses"", *Proceedings of the 9th annual ACM symposium on User interface software and technology*; Pub 1996 ACM Press New York, NY, USA; (1996),51-58.

Cowperthwaite, David J., ""Occlusion Resolution Operators for Three-Dimensional Detail-in-Context"", Burnaby, British Columbia: Simon Fraser University; (2000).

Carpendale, M.S.T. ""A Framework for Elastic Presentation Space"", *Thesis Simon Fraser University*, XP001051168; Chapter 3-5; appendix A,B; (Mar. 1999),pp. 1-271.

Carpendale, M.S.T. et al., ""Exploring Distinct Aspects of the Distortion Viewing Paradigm"", *Technical Report TR 97-08*, School of Computer Science, Simon Fraser University, Burnaby, British Columbia, Canada; (Sep. 1997).

Cowperthwaite, David J., et al., ""Visual Access for 3D Data"", in *Proceedings of ACM CHI 96 Conference on Human Factors in Computer Systems*, vol. 2 of *Short Papers: Alternative Methods of Interaction*; (1996),pp. 175-176.

Keahey, T. A., ""Visualization of High-Dimensional Clusters Using NonLinear Magnification"", *Technical Report LA-UR-98-2776*, Los Alamos National Laboratory; (1998).

Tigges, M. et al., ""Generalized Distance Metrics for Implicit Surface Modeling"", *Proceedings of the Tenth Western Computer Graphics Symposium*; (Mar. 1999).

Bossen, F. J., ""Anisotropic Mesh Generation With Particles"", *Technical Report CMU-CS-96-134*, CS Dept, Carnegie Mellon University; (May 1996).

Bossen, F. J., et al., ""A Pliant Method for Anisotropic Mesh Generation"", *5th Intl. Meshing Roundtable*; (Oct. 1996),pp. 63-74.

Wilson, et al., ""Direct Volume Rendering Via 3D Textures"", *Technical Report UCSC-CRL-94-19*, University of California, Santa Cruz, Jack Baskin School of Engineering; (Jun. 1994).

Carpendale, M.S.T. "A Framework for Elastic Presentation Space", *PhD thesis*, Simon Fraser University; (1999),pp. 69, 72, 78-83,98-100, 240, and 241.

Keahey, T. A., et al., ""Techniques for Non-Linear Magnification Transformations"", *Information Visualization '96, Proceedings IEEE Symposium on*, San Francisco, CA, Los Alamitos, CA, USA, *IEEE Comput. Soc*, US: XP010201943; ISBN: 0-8186-7668-X,(Oct. 28, 1996), pp. 38-45.

Carpendale, M. Sheelagh T., et al., ""3-Dimensional Pliable Surfaces: For the Effective Presentation of Visual Information"", *UIST '95, 8th Annual Symposium on User Interface Software and Technology, Proceedings of the ACM Symposium on User Interface Software and Technology*, Pittsburgh, PA, *ACM Symposium on User Interface Software and Technology*, New York, Nov. 14, 1995 (1995-, (Nov. 14-17, 1995),pp. 217-226.

Tominski, Christian et al., ""Fisheye Tree Views and Lenses for Graph Visualization"", pp. 1-8.

Keahey, T. A., ""Getting Along: Composition of Visualization Paradigms"", Visual Insights, Inc.; (2001).

Sakamoto, Chikara et al., ""Design and Implementation of a Parallel Pthread Library (PPL) with Parallelism and Portability"", *Systems and Computers in Japan*, New York, US, vol. 29, No. 2; XP000752780, ISSN: 0882-1666 abstract,(Feb. 1, 1998),pp. 28-35.

Deng, K. et al., ""Texture Mapping with a Jacobian-Based Spatially-Variant Filter",", *Proceedings 10th Pacific Conference on Computer Graphics and Applications*, Beijing, China, 2002 Los Alamitos, CA, USA, *IEEE Comput. Soc*, USA; XP00224932, ISBN; 0-7695-1784-6,(Oct. 9-11, 2002),pp. 460-461.

Welsh, Michelle "Futurewave Software", *Business Wire*; (Nov. 15, 1993).

Lamar, et al., "A Magnification Lens for Interactive Volume Visualization", *ACM*; pp. 1-10.

Fitzmaurice, G. et al., ""Tracking Menus"", *UIST*; (2003),pp. 71-79.

Stone, et al., "The movable filter as a user interface tool", *Proceedings of CHI ACM*; (1992),pp. 306-312.

Baudisch, P. et al., ""Halo: a Technique for Visualizing Off-Screen Locations"", *CHI*; (Apr. 5-10, 2003).

Baudisch, P. et al., ""Drag-and-Pop: Techniques for Accessing Remote Screen Content on Touch-and-Pen-Operated Systems"", *Interact '03*, (2003).

Carpendale, M.S.T. et al., ""Making Distortions Comprehensible"", *Visual Languages, Proceedings, 1997 IEEE Symposium on Isle of Capri*, Italy, Sep. 23-26, 1997, Los Alamitos, CA, USA, *IEEE Comput. Soc.*, US, Sep. 23, 1997; XP010250566, ISBN: 0-8186-8144-6,(Sep. 23-26, 1997),pp. 36-45.

(56) References Cited

OTHER PUBLICATIONS

Ito, Minoru et al., ""A Three-Level Checkerboard Pattern (TCP) Projection Method for Curved Surface Measurement"", *Pattern Recognition*, Pergamon Press Inc., Elmsford, N.Y., US vol. 28, No. 1; XP004014030, ISSN 0031-3203,(1995),pp. 27-40.
Keahey, T A., et al., ""Nonlinear Magnification Fields"", *Information Visualization, 1997, Proceedings, IEEE Symposium on Phoenix*, AZ, USA, Los Alamitos, CA, USA, *IEEE Comput. Soc.*, US; XP010257169; ISBN: 0-8186-8189-6,(Oct. 20-21, 1997),pp. 51-58 and 121.
Rauschenbach, U. ""The Rectangular Fish Eye View as an Efficient Method for the Transmission and Display of Large Images"", *Image Processing, ICIP 99, Proceedings, 1999 International Conference on*, Kobe, Japan, Oct. 24-28, 1999, Piscataway, NJ, USA, *IEEE*, US, XP010368852, ISBN 0-7803-5467-2 p. 115, left-hand column—p. 116, paragraph 3, p. 118, paragraph 7.1; (1999),pp. 115-119.
Keahey, T. A., "Nonlinear Magnification", (*Indiana University Computer Science*), (1997).
Watt, et al., "Advanced Animation and Rendering Techniques", (Addison-Wesley Publishing), (1992),p. 106-108.
Boots, B. N., "Delauney Triangles: An Alternative Approach to Point Pattern Analysis", *Proc. Assoc. Am. Geogr.* 6, (1974),p. 26-29.
Sheelagh, M. et al., ""Distortion Viewing Techniques for 3-Dimensional Data"", *Information Visualization '96, Proceedings IEEE Symposium on San Francisco*, CA, USA, Los Alamitos, CA, USA, *IEEE Comput. Soc*, US Oct. 28, 1996; XP010201944; ISBN: 0-8186-7668-X,(Oct. 28-29, 1996),pp. 46-53, 119.
Leung, Y. K., et al., ""A Review and Taxonomy of Distortion-Oriented Presentation Techniques"", *ACM Transactions on Computer-Human Interaction*, 'Online! vol. 1, No. 2, XP002252314; Retrieved from the Internet: <URL:http://citeseer.nj.nec.com/ leung94review.html> 'retrieved on Aug. 21, 2003! the whole document,(Jun. 1994),pp. 126-160.
"Non Final Office Action", U.S. Appl. No. 10/358,394, (Mar. 13, 2009).
Sarkar, et al., "Stretching the Rubber Sheet: A Metaphor for Viewing Large Layouts on Small Screens", *Proc. of the 6th annual ACM symp. on User interface software an technology*, Atlanta, GA, (Dec. 1993),p. 81-91.
Carpendale, et al., "Graph Folding: Extending Detail and Context Viewing into a Tool for Subgraph Comparison", in *Proceedings of Graph Drawing 1995*, Passau, Germany, (1995),pp. 127-139.
Carpendale, M.S.T. "A Framework for Elastic Presentation Space", http://pages.cpsc.ucalgary.ca/~sheelagh/personal/thesis/, (Nov. 19, 1999).
"Non Final Office Action", U.S. Appl. No. 11/542,120, (Jan. 22, 2009),20 pages.
Carpendale, Marianne S.T., "A Framework for Elastic Presentation Space" (Burnaby, British Columbia: Simon Fraser University, 1999).
"BPAI Decision", U.S. Appl. No. 10/682,298, (Dec. 30, 2009),14 pages.
"Notice of Allowance", U.S. Appl. No. 11/410,024, (Jan. 4, 2010), 7 pages.
"Final Office Action", U.S. Appl. No. 11/673,038, (Jan. 8, 2010), 33 pages.
"Advisory Action", U.S. Appl. No. 11/541,778, (Feb. 1, 2010), 3 pages.
"Advisory Action", U.S. Appl. No. 11/935,222, (Feb. 4, 2010), 3 pages.
"Non-Final Office Action", U.S. Appl. No. 11/410,024, (Mar. 11, 2009),35 pages.
"Foreign Office Action", Application Serial No. 2002-536993, (Mar. 11, 2009),2 pages.
"Notice of Allowance", U.S. Appl. No. 11/401,349, (Apr. 17, 2009),35 pages.
Schmalstieg, Dieter et al., "Using transparent props for interaction with the virtual table", U.S. Appl. No. 11/410,024, Proceedings of the 1999 symposium on Interactive 3D graphics.,(Apr. 26, 1999),8 pages.

"Non Final Office Action", U.S. Appl. No. 10/705,199, (May 12, 2009),46 pages.
"Non Final Office Action", U.S. Appl. No. 11/541,778, (Jun. 19, 2009),36 pages.
"Non Final Office Action", U.S. Appl. No. 11/673,038, (Jul. 13, 2009),45 pages.
"Non Final Office Action", U.S. Appl. No. 11/410,024, (Jul. 20, 2009),27 pages.
Smith, et al., "Efficient techniques for wide-angle stereo vision using surface projection models", Retrieved from <http://ieee.org/stamp.jsp?arnumber=17045, (1999),6 pages.
"Non Final Office Action", U.S. Appl. No. 11/159,205, (Jul. 27, 2009),28 pages.
"Advisory Action", U.S. Appl. No. 11/249,493, (Aug. 11, 2009),5 pages.
"Advisory Action", U.S. Appl. No. 10/705,199, (Aug. 18, 2009),5 pages.
"Restriction Requirement", U.S. Appl. No. 11/935,222, (Aug. 20, 2009),6 pages.
"Advisory Action", U.S. Appl. No. 11/249,493, (Sep. 14, 2009),4 pages.
"Non-Final Office Action", U.S. Appl. No. 12/364,450, (Sep. 30, 2009),10 pages.
"Notice of Allowance", U.S. Appl. No. 10/358,394, (Oct. 8, 2009),8 pages.
"Advisory Action", U.S. Appl. No. 11/249,493, (Sep. 14, 2009), 4 pages.
"Final Office Action", U.S. Appl. No. 11/935,222, (Nov. 24, 2009), 8 pages.
"Final Office Action", U.S. Appl. No. 11/541,778, (Dec. 4, 2009), 12 pages.
"Notice of Allowance", U.S. Appl. No. 11/214,886, (Dec. 15, 2009), 16 pages.
"Restriction Requirement", U.S. Appl. No. 12/368,263, (Mar. 9, 2010), 7 pages.
"Notice of Allowance", U.S. Appl. No. 10/705,199, (Mar. 10, 2010), 18 pages.
"Advisory Action", U.S. Appl. No. 11/673,038, (Mar. 25, 2010), 3 pages.
"Final Office Action", U.S. Appl. No. 11/159,205, (Mar. 25, 2010), 16 pages.
"Notice of Allowance", U.S. Appl. No. 12/364,450, (Apr. 19, 2010), 4 pages.
"Non-Final Office Action", U.S. Appl. No. 11/236,694, (Apr. 20, 2010), 9 pages.
"Non Final Office Action", U.S. Appl. No. 12/368,263, (Apr. 30, 2010), 8 pages.
"Non Final Office Action", U.S. Appl. No. 12/368,267, (Jun. 11, 2010), 12 pages.
"Notice of Allowability", U.S. Appl. No. 12/364,450, (Jun. 18, 2010), 2 pages.
"Non Final Office Action", U.S. Appl. No. 12/388,437, (Jun. 23, 2010), 7 pages.
"Non Final Office Action", U.S. Appl. No. 12/764,724, (Jul. 1, 2010), 20 pages.
"Non Final Office Action", U.S. Appl. No. 11/673,038, (Jul. 22, 2010), 39 pages.
"Non Final Office Action", U.S. Appl. No. 11/138,979, (Sep. 17, 2010), 11 pages.
"Non Final Office Action", U.S. Appl. No. 11/541,778, (Sep. 29, 2010), 10 pages.
"Non Final Office Action", U.S. Appl. No. 11/695,104, (Oct. 1, 2010), 9 pages.
"Final Office Action", U.S. Appl. No. 11/159,205, (Oct. 6, 2010), 16 pages.
"Non Final Office Action", U.S. Appl. No. 11/236,694, (Oct. 13, 2010), 16 pages.
Lieberman, Henry "Power of Ten Thousand—Navigating in Large Information Spaces", *Proceedings of the 7th annual ACM symposium on User interface software and technology*, Marina del Rey, California, United States, (Nov. 1994), pp. 15-16.

(56) References Cited

OTHER PUBLICATIONS

Mills, Michael et al., "A Magnifier Tool for Video Data", *Proceedings of the SIGCHI conference on Human factors in computing systems*, (1992), pp. 93-96.

Kline, Richard L., et al., "Improving GUI Accessibility for People with Low Vision", *Proceedings of the SIGCHI conference on Human factors in computing systems*, (1995), pp. 114-121.

Perlin, Ken et al., "Pad—an alternative approach to the computer interface", *International Conference on Computer Graphics and Interactive Techniques. Proceedings of the 20th annual conference on Computer graphics and interactive techniques.*, (1993), pp. 57-64.

Bier, Eric A., et al., "The Movable Filter as a User Interface Tool—The Video", *Conference on Human Factors in Computing Systems Conference companion on Human factors in computing systems*, (1995), pp. 413-414.

Bier, Eric A., et al., "Toolglass and Magic Lenses—The See-Through Interface", *International Conference on Computer Graphics and Interactive Techniques Proceedings of the 20th annual conference on Computer graphics and interactive techniques*, (1993), pp. 73-80.

Bier, Eric A., et al., "Toolglass and Magic Lenses—The See-Through Interface", *Conference on Human Factors in Computing Systems Conference companion on Human factors in computing systems*, (1994), pp. 445-446.

Kamba, Tomonari et al., "Using Small Screen Space More Efficiently", *CHI 96* Vancouver, BC Canada, (1996), pp. 383-390.

"Final Office Action", U.S. Appl. No. 12/368,263, (Nov. 5, 2010), 7 pages.

"Final Office Action", U.S. Appl. No. 12/764,724, (Nov. 9, 2010), 21 pages.

\* cited by examiner

GRAPHICAL USER INTERFACE WITH ZOOM FOR DETAIL-IN-CONTEXT PRESENTATIONS

This application is a continuation of U.S. patent application Ser. No. 10/166,736, filed Jun. 12, 2002, now U.S. Pat. No. 7,213,214 the disclosure of which is incorporated herein by reference.

This application claims priority from Canadian Patent Application No. 2,350,342, filed Jun. 12, 2001, and incorporated herein by reference.

The invention relates to the field of computer graphics processing, and more specifically to a graphical user interface (GUI) with zoom functionality for a detail-in-context presentation system.

BACKGROUND OF THE INVENTION

Display screens are the primary visual display interface to a computer. One problem with these visual display screens is that they are limited in size, thus presenting a challenge to user interface design, particularly when larger amounts of information is to be displayed. This problem is normally referred to as the "screen real estate problem".

Well-known solutions to this problem include panning, zooming, scrolling or combinations thereof. While these solutions are suitable for a large number of visual display applications, these solutions become less effective where the visual information is spatially related, such as maps, newspapers and such like. In this type of information display, panning, zooming and/or scrolling is not as effective as much of the context of the panned, zoomed or scrolled display is hidden.

A recent solution to this problem is the application of "detail-in-context" presentation techniques. Detail-in-context is the magnification of a particular region of interest (the "focal region") in a data presentation while preserving visibility of the surrounding information. This technique has applicability to the display of large surface area media, such as maps, on limited size computer screens such as personal digital assistants (PDA's) and cell phones.

In the detail-in-context discourse, differentiation is often made between the terms "representation" and "presentation". A representation is a formal system, or mapping, for specifying raw information or data that is stored in a computer or data processing system. For example, a digital map of a city is a representation of raw data including street names and the relative geographic location of streets and utilities. Such a representation may be displayed visually on computer screen or printed on paper. On the other hand, a presentation is a spatial organization of a given representation that is appropriate for the task at hand. Thus, a presentation of a representation organizes such things as the point of view and the relative emphasis of different parts or regions of the representation. For example, a digital map of a city may be presented with a region magnified to reveal street names.

In general, a detail-in-context presentation may be considered as a distorted view (or distortion) of a portion of the original representation where the distortion is the result of the application of a "lens" like distortion function to the original representation. A detailed review of various detail-in-context presentation techniques such as Elastic Presentation Space ("EPS") may be found in a publication by Marianne S. T. Carpendale, entitled "A Framework for Elastic Presentation Space" (Burnaby, British Columbia: Simon Fraser University, 1999), and incorporated herein by reference.

Development of increasingly powerful computing devices has lead to new possibilities for applications of detail-in-context viewing. At the same time, the demand for user control over the parameters of a detail-in-context lens has increased. Indeed, one shortcoming of current EPS graphics technology and detail-in-context presentation methods is the lack of an effective user friendly graphical user interface ("GUI") for the control of lens display parameters. Generally, with a GUI, a user interacts with icons and controls in a GUI display by moving a pointing device, such as a mouse, which causes a censor or pointer to be moved on the display. When the pointer is over the displayed icon or control, the user presses a button, such as a mouse button, to invoke one or more operations to be performed by the computer system.

A GUI for a detail-in-context presentation system is described in Canadian Patent Application No. 2,345,803 filed by the present applicant. However, this GUI does not provide effective zoom functionality.

A need therefore exists for a GUI for a detail-in-context presentation system that has effective zoom functionality. Consequently, it is an object of the present invention to obviate or mitigate at least some of the above-mentioned disadvantages.

SUMMARY OF THE INVENTION

In general, the present invention provides a GUI with effective zoom functionality for a detail-in-context presentation system.

According to one aspect of the invention, a graphical user interface is provided for manipulating a presentation of a region of interest within visual information displayed on a display screen of a computer display system, the region of interest having a focal region and a shoulder region, the region of interest surrounded by an external region, the computer display system including the display screen, a computer, and a pointing device for positioning a cursor on the display screen. The GUI includes: a) a first bounding shape surrounding the focal region, the first bounding shape having at least two active areas, the active areas for resizing and folding the focal region by repositioning at least one of the active areas with the pointing device; b) a second bounding shape surrounding the shoulder region, the second bounding shape having at least two active areas, the active areas for resizing the shoulder region by repositioning at least one of the active areas with the pointing device; c) a base outline, the base outline positioned within the second bounding shape, the base outline outlining the shoulder region; d) a slide bar, the slide bar having at least one active area, the active area for magnifying the region of interest by repositioning the active area with the pointing device; e) a move area within the region of interest, the move area having at least one active area, the move area located within the region of interest, the active area for moving the region of interest by repositioning the active area with the pointing device; f) at least one zoom area, the zoom area within the visual information, the zoom area having at least one active area, the active area for selecting at least one predetermined zoom operation for the zoom area by selecting the active area with the pointing device; and, g) a zoom button, the zoom button having at least one active area, the active area for activating the zoom area by selecting the active area with the pointing device, thereby enabling the predetermined zoom operation to be selected.

According to another aspect of the invention, a graphical user interface is provided for manipulating a presentation of a region of interest within visual information displayed on a display screen of a computer display system, the region of interest having a focal region and a shoulder region, the region of interest surrounded by an external region, the computer display system including the display screen, a computer, and a pointing device for positioning a cursor on the display screen. The GUI includes: a) a representation of a first bounding rectangle surrounding the focal region, the first bounding rectangle having at least two active areas, the active areas for resizing and folding the focal region by repositioning at least one of the active areas with the pointing device; b) a representation of a second bounding rectangle surrounding the shoulder region, the second bounding rectangle having at least two active areas, the active areas for resizing the shoulder region by repositioning at least one of the active areas with the pointing device; c) a representation of a base outline, the base outline positioned within the second bounding rectangle, the base outline outlining the shoulder region; d) a representation of a pickup point, the pickup point positioned centrally in the region of interest, the pickup point having at least one active area, the active area for moving the base outline and subsequently the region of interest by repositioning the active area with the pointing device; e) a representation of a slide bar, the slide bar positioned in the external region adjacent to the second bounding rectangle, the slide bar having at least one active area, the active area for magnifying the region of interest by repositioning the active area with the pointing device; f) a move area within the region of interest, the move area having at least one active area, the move area located within the region of interest, the move area excluding the first bounding rectangle, the second bounding rectangle, and the pickup icon, the active area for moving the region of interest by repositioning the active area with the pointing device; and, g) a representation of at least one zoom selection point, the zoom selection point having at least one active area, the active area for selecting at least one predetermined zoom operation for at least one of the focal region, the shoulder region, the region of interest, and the external region.

Advantageously, through a user friendly GUI which incorporates zoom functionality, the invention allows a user to quickly navigate to a region of interest within a continuous view of a larger presentation and then zoom in to that region of interest for detailed viewing or editing.

BRIEF DESCRIPTION OF THE DRAWINGS

Embodiments of the invention may best be understood by referring to the following description and accompanying drawings. In the description and drawings, line numerals refer to like structures or processes. In the drawings.

DETAILED DESCRIPTION OF THE PREFERRED EMBODIMENTS

In the following description, numerous specific details are set forth to provide a thorough understanding of the invention. However, it is understood that the invention may be practiced without these specific details. In other instances, well-known software, circuits, structures or processes have not been described or shown in detail in order not to obscure the invention. The term "data processing system" is used herein to refer to any machine for processing data, including the computer systems and network arrangements described herein. The term "Elastic Presentation Space" or "EPS" is used herein to refer to techniques that allow for the adjustment of a visual presentation without interfering with the information content of the representation. The adjective "elastic" is included in the term as it implies the capability of stretching and deformation and subsequent return to an original shape. EPS graphics technology is described by Carpendale in *A Framework for Elastic Presentation Space* (Carpendale, Marianne S. T., *A Framework for Elastic Presentation Space* (Burnaby, British Columbia: Simon Fraser University, 1999)) which is incorporated herein by reference. In EPS graphics technology, a two-dimensional visual representation is placed onto a surface; this surface is placed in three-dimensional space; the surface, containing the representation, is viewed through perspective projection; and the surface is manipulated to effect the reorganization of image details. The presentation transformation is separated into two steps: surface manipulation or distortion and perspective projection. In the drawings, like numerals refer to like structures or processes.

Figure 1:
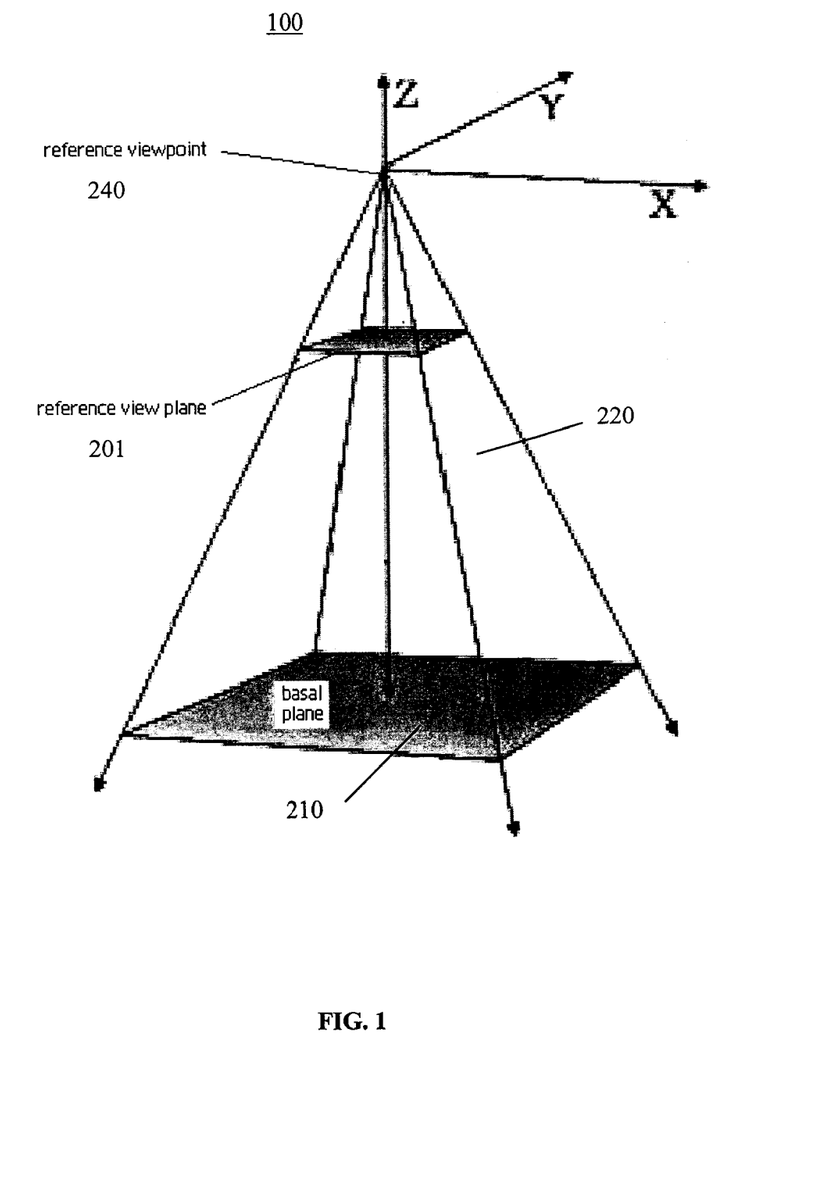
FIG. 1 is a graphical construction illustrating a 3D perspective viewing frustum in accordance with known elastic presentation space graphics technology.

Referring to FIG. 1, there is shown a graphical representation 100 of the geometry for constructing a three-dimensional (3D) perspective viewing frustum 220 relative to an x, y, z coordinate system in accordance with known elastic presentation space ("EPS") graphics technology. In the EPS, detail-in-context views of 2D visual representations are created with sight-line aligned distortions of a two-dimensional (2D) information presentation surface within a 3D perspective viewing frustum 220. In EPS, magnification of regions of interest and the accompanying compression of the contextual region to accommodate this change in scale are produced by the movement of regions of the surface towards the viewpoint 240 located at the apex of the pyramidal shape 220 containing the frustum. The process of projecting these transformed layouts via a perspective projection results in a new 2D layout which includes the zoomed and compressed regions. The use of the third dimension and perspective distortion to provide magnification in EPS provides a meaningful metaphor for the process of distorting the information presentation surface. The 3D manipulation of the information presentation surface in such a system is an intermediate step in the process of creating a new 2D layout of the information.

Figure 2:
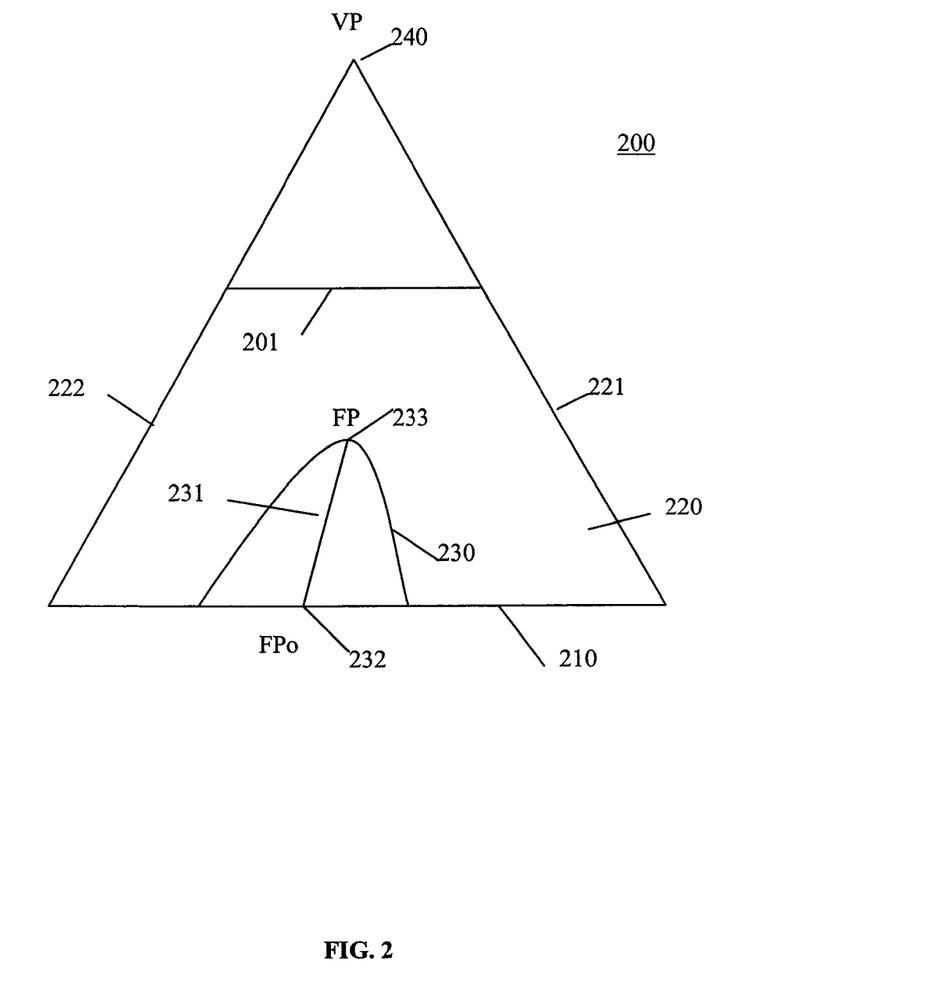
FIG. 2 is a cross-sectional view illustrating a presentation in accordance with known elastic presentation space graphics technology.

Referring to FIG. 2, there is shown geometrical representation of a presentation 200 in accordance with known EPS graphics technology. EPS graphics technology employs viewer-aligned perspective projections to produce detail-in-context presentations in a reference view plane 201 which may be viewed on a display. Undistorted 2D data points are located in a basal plane 210 of a 3D perspective viewing volume or frustum 220 which is defined by extreme rays 221 and 222 and the basal plane 210. A viewpoint ("VP") 240 is located above the centre point of the basal plane 210 and reference view plane 201. Points in the basal plane 210 are displaced upward onto a distorted surface 230 which is defined by a general 3D distortion function (i.e. a detail-in-context distortion basis function). The direction of the viewer-aligned perspective projection corresponding to the distorted surface 230 is indicated by the line FPo-FP 231 drawn from a point FPo 232 in the basal plane 210 through the point FP 233 which corresponds to the focus or focal region or focal point of the distorted surface 230.

To reiterate, EPS refers to a collection of know-how and techniques for performing "detail-in-context viewing" (also known as "multi-scale viewing" and "distortion viewing") of information such as images, maps, and text, using a projection technique summarized below. EPS is applicable to multidimensional data and is well suited to implementation on a computer for dynamic detail-in-context display on an electronic display surface such as a monitor. In the case of two dimensional data, EPS is typically characterized by magnification of areas of an image where detail is desired, in combination with compression of a restricted range of areas of the remaining information (the "context"), the end result typically giving the appearance of a lens having been applied to the display surface. EPS has numerous advantages over conventional zoom, pan, and scroll technologies, including the capability of preserving the visibility of information outside the local region of interest.

In general, in EPS, the source image to be viewed is located in the basal plane. Magnification and compression are achieved through elevating elements of the source image relative to the basal plane, and then projecting the resultant distorted surface onto the reference view plane. EPS performs detail-in-context presentation of n-dimensional data through the use of a procedure wherein the data is mapped into a region in an (n+1) dimensional space, manipulated through perspective projections in the (n+1) dimensional space, and then finally transformed back into n-dimensional space for presentation.

For example, and referring to FIGS. 1 and 2, in two dimensions, EPS can be implemented through the projection of an image onto a reference plane 201 in the following manner. The source image is located on a basal plane 210, and those regions of interest 233 of the image for which magnification is desired are elevated so as to move them closer to a reference plane situated between the reference viewpoint 240 and the reference view plane (RVP) 201. Magnification of the "focal region" 233 closest to the RVP varies inversely with distance from the RVP 201. As shown in FIGS. 1 and 2, compression of regions outside the focal region 233 is a function of both distance from the RVP 201, and the gradient of the function describing the vertical distance from the RVP 201 with respect to horizontal distance from the focal region 233. The resultant combination of magnification and compression of the image as seen from the reference viewpoint 240 results in a lens-like effect similar to that of a magnifying glass applied to the image, and the resultant distorted image may be referred to as a "pliable display surface". Hence, the various functions used to vary the magnification and compression of the image via vertical displacement from the basal plane 210 are described as lenses, lens types, or lens functions. Lens functions that describe basic lens types with point and circular focal regions, as well as certain more complex lenses and advanced capabilities such as folding, have previously been described by Carpendale.

Figure 3:
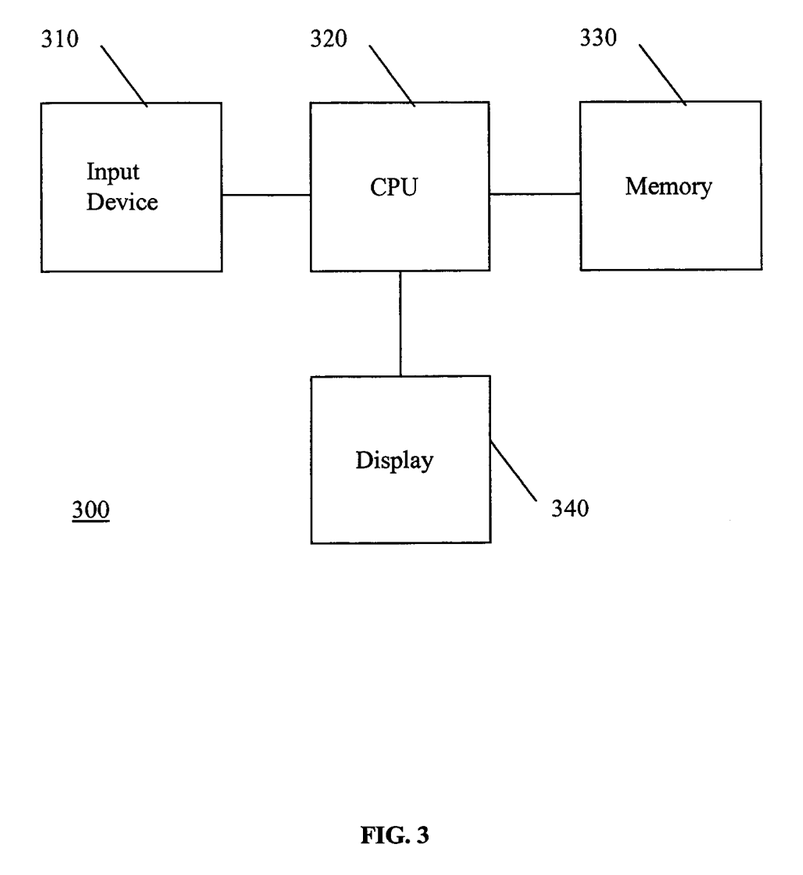
FIG. 3 is a block diagram illustrating an exemplary data processing system for implementing an embodiment of the invention.

System. Referring to FIG. 3, there is shown a block diagram of an exemplary data processing system 300 for implementing an embodiment of the invention. The data processing system is suitable for implementing EPS technology in conjunction with a graphical user interface ("GUI"). The data processing system 300 includes an input device 310, a central processing unit or CPU 320, memory 330, and a display 340. The input device 310 may be a keyboard, mouse, trackball, or similar device. The CPU 320 may include dedicated coprocessors and memory devices. The memory 330 may include RAM, ROM, databases, or disk devices. And, the display 340 may include a computer screen or terminal device. The data processing system 300 has stored therein data representing sequences of instructions which when executed cause the method described herein to be performed. Of course, the data processing system 300 may contain additional software and hardware a description of which is not necessary for understanding the invention.

GUI with Lens Control Elements. As mentioned, detail-in-context presentations of data using techniques such as pliable surfaces, as described by Carpendale, are useful in presenting large amounts of information on limited-size display surfaces. Detail-in-context views allow magnification of a particular region of interest (the "focal region") 233 in a data presentation while preserving visibility of the surrounding information 210. In the following, a GUI having lens control elements that can be implemented in software and applied to the control of detail-in-context data presentations, including EPS and pliable surfaces, is described. The software can be loaded into and run by the exemplary data processing system 300 of FIG. 3.

Figure 4:
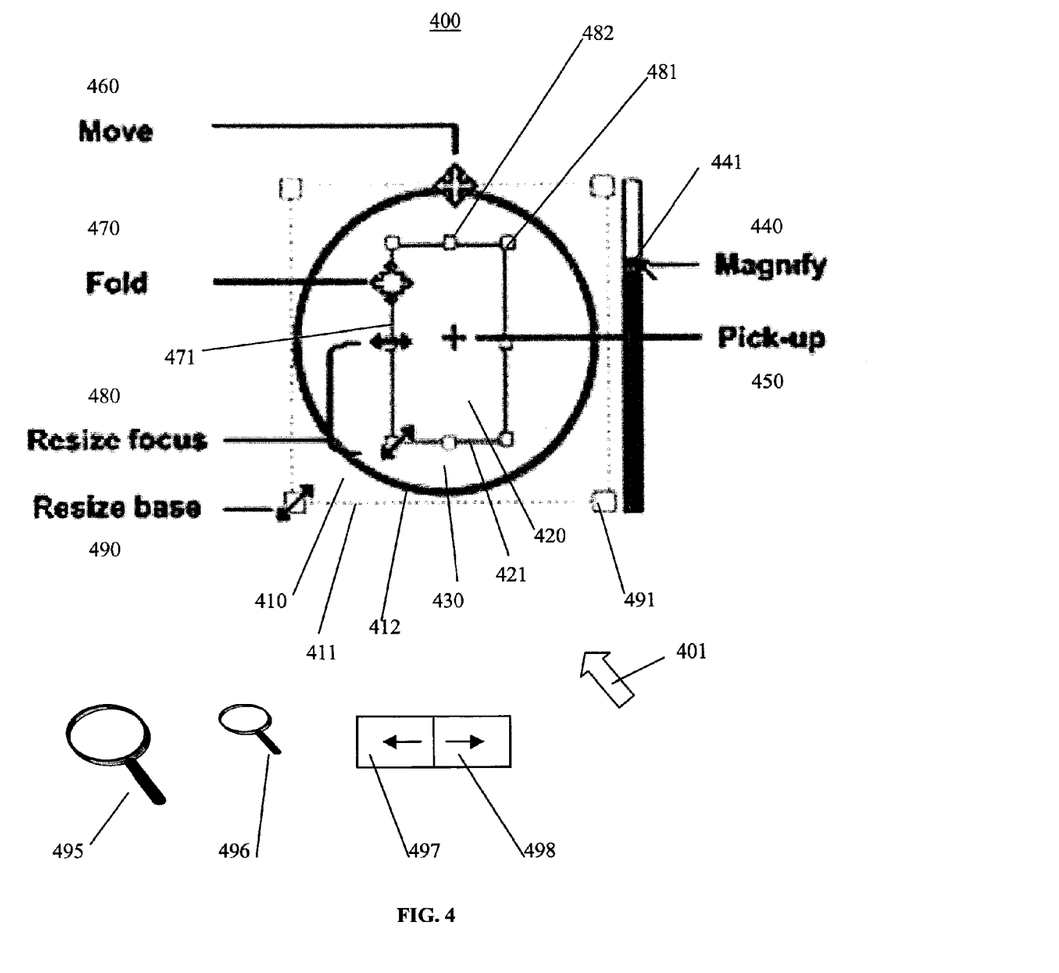
FIG. 4 a partial screen capture illustrating a GUI having lens control elements for user interaction with detail-in-context data presentations in accordance with an embodiment of the invention; and, FIG. 5 is a flow chart illustrating a general method for displaying a region of interest within visual information on a display screen of a computer display system in accordance with an embodiment of the invention.

Referring to FIG. 4, there is a partial screen capture illustrating a GUI 400 having lens control elements for user interaction with detail-in-context data presentations in accordance with an embodiment of the invention. Detail-in-context data presentations are characterized by magnification of areas of an image where detail is desired, in combination with compression of a restricted range of areas of the remaining information (i.e. the "context"), the end result typically giving the appearance of a "lens" having been applied to the display screen surface. This "lens" 410 includes a "focal region" 420 having high magnification, a surrounding "shoulder region" 430 where information is typically visibly compressed, and a "base" 412 surrounding the shoulder region 430 and defining the extent of the lens 410. In FIG. 4, the lens 410 is shown with a circular shaped base 412 (or outline) and with a focal region 420 lying near the center of the lens 410. However, the lens 410 and focal region 420 may have any desired shape. Referring again to FIG. 2, the lens 410 corresponds to the projection of the distorted surface 230 and focal region 233 onto the reference plane 201.

In general, the GUI 400 has lens control elements that, in combination, provide for the interactive control of the lens 410. The effective control of the characteristics of the lens 410 by a user (i.e. dynamic interaction with a detail-in-context lens) is advantageous. At any given time, one or more of these lens control elements may be made visible to the user on the display surface 340 by appearing as overlay icons on the lens 410. Interaction with each element is performed via the motion of a pointing device 310 (e.g. mouse), with the motion resulting in an appropriate change in the corresponding lens characteristic. As will be described, selection of which lens control element is actively controlled by the motion of the pointing device 310 at any given time is determined by the proximity of the icon representing the pointing device 310 on the display surface 340 (e.g. cursor) to the appropriate component of the lens 410. For example, "dragging" of the pointing device at the periphery of the bounding rectangle of the lens base 412 causes a corresponding change in the size of the lens 410 (i.e. "resizing"). Thus, the GUI 400 provides the user with a visual representation of which lens control element is being adjusted through the display of one or more corresponding icons.

For ease of understanding, the following discussion will be in the context of using a two-dimensional pointing device 310 that is a mouse, but it will be understood that the invention may be practiced with other 2-D or 3-D (or even greater numbers of dimensions) pointing devices including a trackball and keyboard.

A mouse 310 controls the position of a cursor icon 401 that is displayed on the display screen 340. The cursor 401 is moved by moving the mouse 310 over a flat surface, such as the top of a desk, in the desired direction of movement of the cursor 401. Thus, the two-dimensional movement of the mouse 310 on the flat surface translates into a corresponding two-dimensional movement of the cursor 401 on the display screen 340.

A mouse 310 typically has one or more finger actuated control buttons (i.e. mouse buttons). While the mouse buttons can be used for different functions such as selecting a menu option pointed at by the cursor 401, the disclosed invention may use a single mouse button to "select" a lens 410 and to trace the movement of the cursor 401 along a desired path. Specifically, to select a lens 410, the cursor 401 is first located within the extent of the lens 410. In other words, the cursor 401 is "pointed" at the lens 410. Next, the mouse button is depressed and released. That is, the mouse button is "clicked". Selection is thus a point and click operation. To trace the movement of the cursor 401, the cursor 401 is located at the desired starting location, the mouse button is depressed to signal the computer 320 to activate a lens control element, and the mouse 310 is moved while maintaining the button depressed. After the desired path has been traced, the mouse button is released. This procedure is often referred to as "clicking" and "dragging" (i.e. a click and drag operation). It will be understood that a predetermined key on a keyboard 310 could also be used to activate a mouse click or drag. In the following, the term "clicking" will refer to the depression of a mouse button indicating a selection by the user and the term "dragging" will refer to the subsequent motion of the mouse 310 and cursor 401 without the release of the mouse button.

The GUI 400 may include the following lens control elements: move, pickup, resize base, resize focus, fold, magnify, and zoom. Each of these lens control elements generally has at least one lens control icon or alternate cursor icon associated with it. In general, when a lens 410 is selected by a user through a point and click operation, the following lens control icons may be displayed over the lens 410: pickup icon 450, base outline icon 412, base bounding rectangle icon 411, focal region bounding rectangle icon 421, handle icons 481, 482, 491, magnify slide bar icon 440. In addition, a zoom icon 495 may be displayed over the lens 410 or on a toolbar or pull-down menu. Typically, these icons are displayed simultaneously after selection of the lens 410. In addition, when the cursor 401 is located within the extent of a selected lens 410, an alternate cursor icon 460, 470, 480, 490 may be displayed over the lens 410 to replace the cursor 401 or may be displayed in combination with the cursor 401. In addition, when zoom functionality is selected by the user, for example, through the zoom icon 495, an alternate cursor icon 496 may be displayed to replace the cursor 401 or may be displayed in combination with the cursor 401. These lens control elements, corresponding icons, and their effects on the characteristics of a lens 410 are described below with reference to FIG. 4.

In general, when a lens 410 is selected by a point and click operation, bounding rectangle icons 411, 421 are displayed surrounding the base 412 and focal region 420 of the selected lens 410 to indicate that the lens 410 has been selected. With respect to the bounding rectangles 411, 421 one might view them as glass windows enclosing the lens base 412 and focal region 420, respectively. The bounding rectangles 411, 421 include handle icons 481, 482, 491 allowing for direct manipulation of the enclosed base 412 and focal region 420 as will be explained below. Thus, the bounding rectangles 411, 421 not only inform the user that the lens 410 has been selected, but also provide the user with indications as to what manipulation operations might be possible for the selected lens 410 though use of the displayed handles 481, 482, 491. Note that it is well within the scope of the present invention to provide a bounding region having a shape other than generally rectangular. Such a bounding region could be of any of a great number of shapes including oblong, oval, ovoid, conical, cubic, cylindrical, polyhedral, spherical, etc.

Moreover, the cursor 401 provides a visual cue indicating the nature of an available lens control element. As such, the cursor 401 will generally change in form by simply pointing to or selecting a different lens control icon 450, 412, 411, 421, 481, 482, 491, 440, 495. For example, when resizing the base 412 of a lens 410 using a corner handle 491, the cursor 401 will change form to a resize icon 490 once it is pointed at (i.e. positioned over) the corner handle 491. The cursor 401 will remain in the form of the resize icon 490 until the cursor 401 has been moved away from the corner handle 491. Move. Lateral movement of a lens 410 is provided by the move lens control element of the GUI. This functionality is accomplished by the user first selecting the lens 410 through a point and click operation. Then, the user points to a point within the lens 410 that is other than a point lying on a lens control icon 450, 412, 411, 421, 481, 482, 491, 440, 495. When the cursor 401 is so located, a move icon 460 is displayed over the lens 410 to replace the cursor 401 or may be displayed in combination with the cursor 401. The move icon 460 not only informs the user that the lens 410 may be moved, but also provides the user with indications as to what movement operations are possible for the selected lens 410. For example, the move icon 460 may include arrowheads indicating up, down, left, and right motion. Next, the lens 410 is moved by a click and drag operation in which the user clicks and drags the lens 410 to the desired position on the screen 340 and then releases the mouse button 310. The lens 410 is locked in its new position until a further pickup and move operation is performed.

Pickup. Lateral movement of a lens 410 is also provided by the pickup lens control element of the GUI. This functionality is accomplished by the user first selecting the lens 410 through a point and click operation. As mentioned above, when the lens 410 is selected a pickup icon 450 is displayed over the lens 410 near the centre of the lens 410. Typically, the pickup icon 450 will be a crosshairs. In addition, a base outline 412 is displayed over the lens 410 representing the base 412 of the lens 410. The crosshairs 450 and lens outline 412 not only inform the user that the lens has been selected, but also provides the user with an indication as to the pickup operation that is possible for the selected lens 410. Next, the user points at the crosshairs 450 with the cursor 401. Then, the lens outline 412 is moved by a click and drag operation in which the user clicks and drags the crosshairs 450 to the desired position on the screen 340 and then releases the mouse button 310. The full lens 410 is then moved to the new position and is locked there until a further pickup operation is performed. In contrast to the move operation described above, with the pickup operation, it is the outline 412 of the lens 410 that the user repositions rather than the full lens 410.

Resize Base. Resizing of the base 412 (or outline) of a lens 410 is provided by the resize base lens control element of the GUI. After the lens 410 is selected, a bounding rectangle icon 411 is displayed surrounding the base 412. The bounding rectangle 411 includes handles 491. These handles 491 can be used to stretch the base 412 taller or shorter, wider or narrower, or proportionally larger or smaller. The corner handles 491 will keep the proportions the same while changing the size. The middle handles (not shown) will make the base 412 taller or shorter, wider or narrower. Resizing the base 412 by the corner handles 491 will keep the base 412 in proportion. Resizing the base 412 by the middle handles (not shown) will change the proportions of the base 412. That is, the middle handles (not shown) change the aspect ratio of the base 412 (i.e. the ratio between the height and the width of the bounding rectangle 411 of the base 412). When a user points at a handle 491 with the cursor 401 a resize icon 490 may be displayed over the handle 491 to replace the cursor 401 or may be displayed in combination with the cursor 401. The resize icon 490 not only informs the user that the handle 491 may be selected, but also provides the user with indications as to the resizing operations that are possible with the selected handle. For example, the resize icon 490 for a corner handle 491 may include arrows indicating proportional resizing. The resize icon (not shown) for a middle handle (not shown) may include arrows indicating width resizing or height resizing. After pointing at the desired handle 491, the user would click and drag the handle 491 until the desired shape and size for the base 412 is reached. Once the desired shape and size are reached, the user would release the mouse button 310. The base 412 of the lens 410 is then locked in its new size and shape until a further base resize operation is performed.

Resize Focus. Resizing of the focal region 420 of a lens 410 is provided by the resize focus lens control element of the GUI. After the lens 410 is selected, a bounding rectangle icon 421 is displayed surrounding the focal region 420. The bounding rectangle 421 includes handles 481, 482. These handles 481, 482 can be used to stretch the focal region 420 taller or shorter, wider or narrower, or proportionally larger or smaller. The corner handles 481 will keep the proportions the same while changing the size. The middle handles 482 will make the focal region 420 taller or shorter, wider or narrower. Resizing the focal region 420 by the corner handles 481 will keep the focal region 420 in proportion. Resizing the focal region 420 by the middle handles 482 will change the proportions of the focal region 420. That is, the middle handles 482 change the aspect ratio of the focal region 420 (i.e. the ratio between the height and the width of the bounding rectangle 421 of the focal region 420). When a user points at a handle 481, 482 with the cursor 401 a resize icon 480 may be displayed over the handle 481, 482 to replace the cursor 401 or may be displayed in combination with the cursor 401. The resize icon 480 not only informs the user that a handle 481, 482 may be selected, but also provides the user with indications as to the resizing operations that are possible with the selected handle. For example, the resize icon 480 for a corner handle 481 may include arrows indicating proportional resizing. The resize icon 480 for a middle handle 482 may include arrows indicating width resizing or height resizing. After pointing at the desired handle 481, 482, the user would click and drag the handle 481, 482 until the desired shape and size for the focal region 420 is reached. Once the desired shape and size are reached, the user would release the mouse button 310. The focal region 420 is then locked in its new size and shape until a further focus resize operation is performed.

Fold. Folding of the focal region 420 of a lens 410 is provided by the fold control element of the GUI. In general, control of the degree and direction of folding (i.e. skewing of the viewer aligned vector 231 as described by Carpendale) is accomplished by a click and drag operation on a point 471, other than a handle 481, 482, on the bounding rectangle 421 surrounding the focal region 420. The direction of folding is determined by the direction in which the point 471 is dragged. The degree of folding is determined by the magnitude of the translation of the cursor 401 during the drag. In general, the direction and degree of folding corresponds to the relative displacement of the focus 420 with respect to the lens base 410. In other words, and referring to FIG. 2, the direction and degree of folding corresponds to the displacement of the point FP 233 relative to the point FPo 232, where the vector joining the points FPo 232 and FP 233 defines the viewer aligned vector 231.

In particular, after the lens 410 is selected, a bounding rectangle icon 421 is displayed surrounding the focal region 420. The bounding rectangle 421 includes handles 481, 482. When a user points at a point 471, other than a handle 481, 482, on the bounding rectangle 421 surrounding the focal region 420 with the cursor 401, a fold icon 470 may be displayed over the point 471 to replace the cursor 401 or may be displayed in combination with the cursor 401. The fold icon 470 not only informs the user that a point 471 on the bounding rectangle 421 may be selected, but also provides the user with indications as to what fold operations are possible. For example, the fold icon 470 may include arrowheads indicating up, down, left, and right motion. By choosing a point 471, other than a handle 481, 482, on the bounding rectangle 421 a user may control the degree and direction of folding. To control the direction of folding, the user would click on the point 471 and drag in the desired direction of folding. To control the degree of folding, the user would drag to a greater or lesser degree in the desired direction of folding. Once the desired direction and degree of folding is reached, the user would release the mouse button 310. The lens 410 is then locked with the selected fold until a further fold operation is performed.

Magnify. Magnification of the lens 410 is provided by the magnify lens control element of the GUI. After the lens 410 is selected, the magnify control is presented to the user as a slide bar icon 440 near or adjacent to the lens 410 and typically to one side of the lens 410. Sliding the bar 441 of the slide bar 440 results in a proportional change in the magnification of the lens 410. The slide bar 440 not only informs the user that magnification of the lens 410 may be selected, but also provides the user with an indication as to what level of magnification is possible. The slide bar 440 includes a bar 441 that may be slid up and down, or left and right, to adjust and indicate the level of magnification. To control the level of magnification, the user would click on the bar 441 of the slide bar 440 and drag in the direction of desired magnification level. Once the desired level of magnification is reached, the user would release the mouse button 310. The lens 410 is then locked with the selected magnification until a further magnification operation is performed.

Typically, the focal region 420 is an area of the lens 410 having constant magnification (i.e. if the focal region is a plane). Again referring to FIGS. 1 and 2, magnification of the focal region 420, 233 varies inversely with the distance from the focal region 420, 233 to the reference view plane (RVP) 201. Magnification of areas lying in the shoulder region 430 of the lens 410 also varies inversely with their distance from the RVP 201. Thus, magnification of areas lying in the shoulder region 430 will range from unity at the base 412 to the level of magnification of the focal region 420.

Zoom. Zoom functionality is provided by the zoom lens control element of the GUI. Referring to FIG. 2, the zoom lens control element, for example, allows a user to quickly navigate to a region of interest 233 within a continuous view of a larger presentation 210 and then zoom in to that region of interest 233 for detailed viewing or editing. Referring to FIG. 4, the combined presentation area covered by the focal region 420 and shoulder region 430 and surrounded by the base 412 may be referred to as the "extent of the lens". Similarly, the presentation area covered by the focal region 420 may be referred to as the "extent of the focal region". The extent of the lens may be indicated to a user by a base bounding rectangle 411 when the lens 410 is selected. The extent of the lens may also be indicated by an arbitrarily shaped figure that bounds or is coincident with the perimeter of the base 412. Similarly, the extent of the focal region may be indicated by a second bounding rectangle 421 or arbitrarily shaped figure. The zoom lens control element allows a user to: (a) "zoom in" to the extent of the focal region such that the extent of the focal region fills the display screen 340 (i.e. "zoom to focal region extent"); (b) "zoom in" to the extent of the lens such that the extent of the lens fills the display screen 340 (i.e. "zoom to lens extent"); or, (c) "zoom in" to the area lying outside of the extent of the focal region such that the area without the focal region is magnified to the same level as the extent of the focal region (i.e. "zoom to scale"). In addition, the zoom lens control element maintains a record of zoom operations such that the user may restore pre-zoom operation presentations. This record of zoom operations may be accessed by or presented to the user through "Undo" and "Redo" icons 497, 498 or a pull-down operation history menu (not shown).

In particular, after the lens 410 is selected, a bounding rectangle icon 411 is displayed surrounding the base 412 and a bounding rectangle icon 421 is displayed surrounding the focal region 420. Zoom functionality is accomplished by the user first selecting the zoom icon 495 through a point and click operation When a user selects zoom functionality, a zoom cursor icon 496 may be displayed to replace the cursor 401 or may be displayed in combination with the cursor 401. The zoom cursor icon 496 provides the user with indications as to what zoom operations are possible. For example, the zoom cursor icon 496 may include a magnifying glass. By choosing a point within the extent of the focal region, within the extent of the lens, or without the extent of the lens, the user may control the zoom function. To zoom in to the extent of the focal region such that the extent of the focal region fills the display screen 340 (i.e. "zoom to focal region extent"), the user would point and click within the extent of the focal region. To zoom in to the extent of the lens such that the extent of the lens fills the display screen 340 (i.e. "zoom to lens extent"), the user would point and click within the extent of the lens. Or, to zoom in to the presentation area without the extent of the focal region, such that the area without the extent of the focal region is magnified to the same level as the extent of the focal region (i.e. "zoom to scale"), the user would point and click without the extent of the lens. After the point and click operation is complete, the presentation is locked with the selected zoom until a further zoom operation is performed. The user may undo and redo zoom operations by selecting the Undo and Redo icons 497, 498 using point and click operations. The Undo and Redo icons 497, 498 may be located on a menu bar.

Alternatively, rather than choosing a point within the extent of the focal region, within the extent of the lens, or without the extent of the lens to select the zoom function, a zoom function menu with multiple items (not shown) or multiple zoom function icons (not shown) may be used for zoom function selection. The zoom function menu may be presented as a pull-down menu. The zoom function icons may be presented in a toolbar or adjacent to the lens 410 when the lens is selected. Individual zoom function menu items or zoom function icons may be provided for each of the "zoom to focal region extent", "zoom to lens extent", and "zoom to scale" functions described above. In this alternative, after the lens 410 is selected, a bounding rectangle icon 411 may be displayed surrounding the base 412 and a bounding rectangle icon 421 may be displayed surrounding the focal region 420. Zoom functionality is accomplished by the user selecting a zoom function from the zoom function menu or via the zoom function icons using a point and click operation. In this way, a zoom function may be selected without considering the position of the cursor 401 within the lens 410.

Icon Hiding. Advantageously, a user may choose to hide one or more lens control icons 450, 412, 411, 421, 481, 482, 491, 440, 495 shown in FIG. 4 from view so as not to impede the user's view of the data (i.e. visual information) within the lens 410. This may be helpful, for example, during a move operation. A user may select this option through means such as a menu or lens property dialog box.

Figure 5:
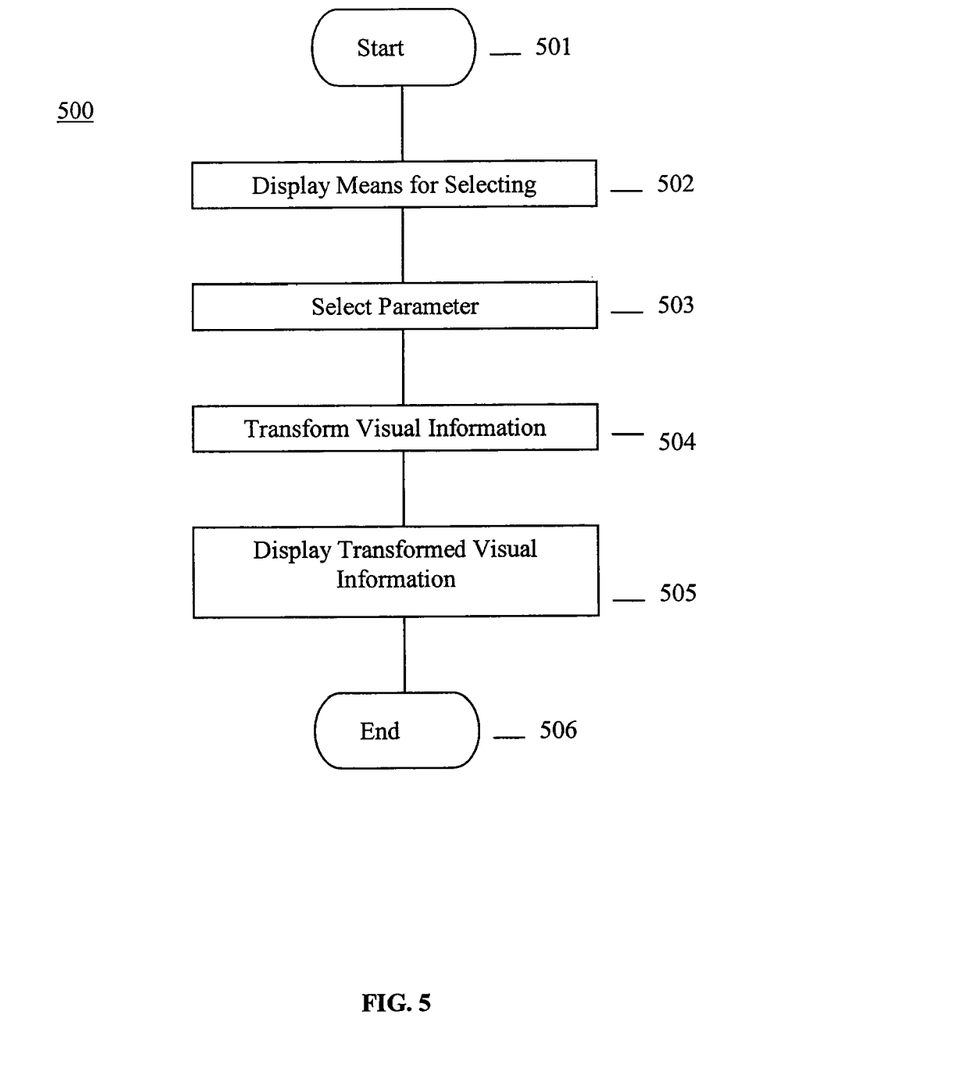

Method. Referring to FIG. 5, there is shown a flow chart 500 illustrating a general method for displaying a region of interest 410 within visual information on a display screen 340 of a computer display system 300, the region of interest 410 having a focal region 420 and a shoulder region 430, the region of interest 410 surrounded by an external region, the computer display system 300 including the display screen 340, a computer 320, and a pointing device 310 for positioning a cursor 401 on the display screen 340, in accordance with an embodiment of the invention. At step 501, the method starts. At step 502, means are provided for selecting at least one parameter for transforming at least one of the region of interest 410, the focal region 420, and the external region (not shown). At step 503, the parameter is selected using. the selecting means. At step 504, the visual information is transformed in accordance with a predetermined distortion function and the parameter to produce transformed visual information. At step 505, the transformed visual information is displayed on the display screen 340. At step 506, the method ends.

The selected parameter may include a magnification for the region of interest 410, a magnification for the focal region 420, a magnification for the shoulder region 430, and a magnification for the external region (not shown). The means for selecting may include a zoom button 495 and a zoom area. The zoom area may include a first zoom area positioned over the focal region 420, a second zoom area positioned over the shoulder region 430, and a third zoom area positioned over the external region (not shown). The predetermined distortion function for the first zoom area may magnify the focal region 420 to fill the display screen 340. The predetermined distortion function for the second zoom area may magnify the region of interest 410 to fill the display screen 340. And, the predetermined distortion function for the third zoom area may magnify the shoulder region 430 and the external region (not shown) to match the existing level of magnification of the focal region 420.

Alternatively, the means for selecting may include at least one zoom function icon or at least one zoom function menu item. The zoom function icons may be located on a tool bar or they may be positioned in the external region. The zoom function menu items may be located on a pull-down menu. The predetermined distortion functions may be associated with respective zoom function icons or zoom function menu items. A first predetermined distortion function may magnify the focal region 420 to fill the display screen 340. A second predetermined distortion function may magnify the region of interest 410 to fill the display screen 340. And, a third predetermined distortion function may magnify the shoulder region 430 and the external region (not shown) to match the existing level of magnification of the focal region 420.

Data Carrier Product. The sequences of instructions which when executed cause the method described herein to be performed by the exemplary data processing system of FIG. 3 can be contained in a data carrier product according to one embodiment of the invention. This data carrier product can be loaded into and run by the exemplary data processing system of FIG. 3.

Computer Software Product. The sequences of instructions which when executed cause the method described herein to be performed by the exemplary data processing system of FIG. 3 can be contained in a computer software product according to one embodiment of the invention. This computer software product can be loaded into and run by the exemplary data processing system of FIG. 3.

Integrated Circuit Product. The sequences of instructions which when executed cause the method described herein to be performed by the exemplary data processing system of FIG. 3 can be contained in an integrated circuit product including a coprocessor or memory according to one embodiment of the invention. This integrated circuit product can be installed in the exemplary data processing system of FIG. 3.

Although preferred embodiments of the invention have bee described herein, it will be understood by those skilled in the art that variations may be made thereto without departing from the spirit of the invention or the scope of the appended claims.

What is claimed is:

1. A method for adjusting a display of detail-in-context information, the method comprising:
    generating an original presentation to be displayed within a display region of a display, wherein the original presentation includes:
        an input image;
        a lens within the input image, wherein an extent of the lens is defined by a base, and wherein the input image outside of the base has a constant magnification;
        a focal region within the lens, wherein image data in the focal region has a constant magnification, which is greater than the constant magnification outside of the base; and
        a shoulder region between the focal region and the base, wherein the shoulder region provides context for the focal region with respect to portions of the image outside of the base by preserving visibility of information surrounding the focal region, wherein the shoulder region has a magnification that varies; and
    adjusting the original presentation by:
        in a first mode, generating an adjusted presentation to fill the display region with the image data in the focal region;
        in a second mode, generating an adjusted presentation to fill the display region with image data in the extent of the lens; and
        in a third mode, generating an adjusted presentation to fill the display region with image data from a portion of the input image outside of the focal region, wherein a magnification applied to the image data from the portion of the input image outside of the focal region is the same as the constant magnification of the focal region.

2. The method of claim 1, wherein said adjusting the original presentation comprises generating the adjusted presentation to fill the display region with the image data in the focal region.

3. The method of claim 2, further comprising:
    receiving a signal from a point and click operation within the focal region; and
    responsively generating the adjusted presentation.

4. The method of claim 1, wherein said adjusting the original presentation comprises generating the adjusted presentation to fill the display region with the image data in the extent of the lens.

5. The method of claim 4, further comprising:
    receiving a signal from a point and click operation within the extent of the lens; and
    responsively generating the adjusted presentation.

6. The method of claim 1, wherein said adjusting the original presentation comprises generating the adjusted presentation to fill the display region with the image data from the portion of the input image outside of the focal region, wherein the magnification applied to the image data from the portion of the input image outside of the focal region is the same as the constant magnification of the focal region.

7. The method of claim 6, further comprising:
    receiving a signal from a point and click operation within the portion of the input image outside of the focal region; and
    responsively generating the adjusted presentation.

8. The method of claim 1, further comprising indicating the extent of the lens with a base bounding rectangle.

9. An apparatus for adjusting a display of detail-in-context information, the apparatus comprising:
    one or more processors and one or more memories together configured to:
    generate an original presentation to be displayed within a display region of a display, wherein the original presentation includes:
        an input image;
        a lens within the input image, wherein an extent of the lens is defined by a base, and wherein the input image outside of the base has a constant magnification;
        a focal region within the lens, wherein image data in the focal region has a constant magnification, which is greater than the constant magnification outside of the base; and
        a shoulder region between the focal region and the base, wherein the shoulder region provides context for the focal region with respect to portions of the image outside of the base by preserving visibility of information surrounding the focal region, wherein the shoulder region has a magnification that varies; and
    adjust the original presentation by:
        in a first mode, generating an adjusted presentation to fill the display region with the image data in the focal region;
        in a second mode, generating an adjusted presentation to fill the display region with image data in the extent of the lens; and
        in a third mode, generating an adjusted presentation to fill the display region with image data from a portion of the input image outside of the focal region, wherein a magnification applied to the image data from the portion of the input image outside of the focal region is the same as the constant magnification of the focal region.

10. The apparatus of claim 9, wherein the one or more processors and the one or more memories together are configured to adjust the original presentation by generating the adjusted presentation to fill the display region with the image data in the focal region.

11. The apparatus of claim 10, wherein the one or more processors and the one or more memories together are further configured to:
   receive a signal from a point and click operation within the focal region; and
   responsively generate the adjusted presentation.

12. The apparatus of claim 9, wherein the one or more processors and the one or more memories together are configured to adjust the original presentation by generating the adjusted presentation to fill the display region with the image data in the extent of the lens.

13. The apparatus of claim 12, wherein the one or more processors and the one or more memories together are further configured to:
   receive a signal from a point and click operation within the extent of the lens; and
   responsively generate the adjusted presentation.

14. The apparatus of claim 9, wherein the one or more processors and the one or more memories together are configured to adjust the original presentation by generating the adjusted presentation to fill the display region with the image data from the portion of the input image outside of the focal region, wherein the magnification applied to the image data from the portion of the input image outside of the focal region is the same as the constant magnification of the focal region.

15. The apparatus of claim 14, wherein the one or more processors and the one or more memories together are further configured to:
   receive a signal from a point and click operation within the portion of the input image outside of the focal region; and
   responsively generate the adjusted presentation.

16. The apparatus of claim 9, wherein the one or more processors and the one or more memories together are further configured to indicate the extent of the lens with a base bounding rectangle.

17. A non-transitory computer-readable medium including a set of instructions for execution on one or more processors and configured to cause the one or more processors to:
   generate an original presentation to be displayed within a display region of a display, wherein the original presentation includes:
      an input image;
      a lens within the input image, wherein an extent of the lens is defined by a base, and wherein the input image outside of the base has a constant magnification;
      a focal region within the lens, wherein image data in the focal region has a constant magnification, which is greater than the constant magnification outside of the base; and
      a shoulder region between the focal region and the base, wherein the shoulder region provides context for the focal region with respect to portions of the image outside of the base by preserving visibility of information surrounding the focal region, wherein the shoulder region has a magnification that varies; and
   adjust the original presentation by:
      in a first mode, generating an adjusted presentation to fill the display region with the image data in the focal region;
      in a second mode, generating an adjusted presentation to fill the display region with image data in the extent of the lens; and
      in a third mode, generating an adjusted presentation to fill the display region with image data from a portion of the input image outside of the focal region, wherein a magnification applied to the image data from the portion of the input image outside of the focal region is the same as the constant magnification of the focal region.

18. The non-transitory computer-readable medium of claim 17, wherein the set of instructions is configured to cause the one or more processors to adjust the original presentation by generating the adjusted presentation to fill the display region with the image data in the focal region.

19. The non-transitory computer-readable medium of claim 18, wherein the set of instructions is configured to cause the one or more processors to:
   receive a signal from a point and click operation within the focal region; and
   responsively generate the adjusted presentation.

20. The non-transitory computer-readable medium of claim 17, wherein the set of instructions is configured to cause the one or more processors to adjust the original presentation by generating the adjusted presentation to fill the display region with the image data in the extent of the lens.

21. The non-transitory computer-readable medium of claim 20, wherein the set of instructions is configured to cause the one or more processors to:
   receive a signal from a point and click operation within the extent of the lens; and
   responsively generate the adjusted presentation.

22. The non-transitory computer-readable medium of claim 17, wherein the set of instructions is configured to cause the one or more processors to adjust the original presentation by filling the display region with the image data from the portion of the input image outside of the focal region, wherein the magnification applied to the image data from the portion of the input image outside of the focal region is the same as the constant magnification of the focal region.

23. The non-transitory computer-readable medium of claim 22, wherein the set of instructions is configured to cause the one or more processors to:
   receive a signal from a point and click operation within the portion of the input image outside of the focal region; and
   responsively generate the adjusted presentation.

24. The non-transitory computer-readable medium of claim 17, wherein the set of instructions is configured to cause the one or more processors to indicate the extent of the lens with a base bounding rectangle.

\* \* \* \* \*